April 5, 1927.

A. GREEN 1,623,871

REFRIGERATION AND COLD STORAGE

Filed April 3, 1925    2 Sheets-Sheet 1

Patented Apr. 5, 1927.

1,623,871

UNITED STATES PATENT OFFICE.

ARTHUR GREEN, OF COVENTRY, ENGLAND.

REFRIGERATION AND COLD STORAGE.

Application filed April 3, 1925, Serial No. 20,488, and in Great Britain October 15, 1924.

This invention relates to apparatus for refrigeration and cold storage, of the kind suitable for domestic use and for use in shops or stores where perishable foodstuffs and the like are dealt in.

Such apparatus comprises a cold storage cabinet for the foodstuffs and a small refrigeration plant driven by an electric motor, and with pipe connections for the supply and discharge of the cooling water, if required. In that type of refrigeration apparatus to which this invention relates, in which sulphur dioxide is used as the working fluid for refrigeration, the brine tank, with the evaporator cooler, is placed inside the cold storage cabinet, and the condenser, compression pump, electric motor, and other parts of the apparatus, are placed below or at the side of the cabinet. The apparatus works automatically, the electric motor which drives the pump being started and stopped by a switch controlled by a thermostat, and the cooling water, if used, also being turned on or off automatically. Part of the thermostat is placed inside the cabinet, and part outside, near the motor, the said parts of the thermostat being connected by a pipe. Pipes have also to be led from inside the cabinet to the outside for the circulation of the refrigeration working fluid.

The object of the present invention is to provide an improved construction and arrangement of such refrigerating apparatus in which the various component parts are so mounted that they can be readily applied to a refrigeration cabinet when assembled as a complete unit in working order, and which dispenses with the necessity of connecting the various parts as they are being mounted in position with respect to the cabinet and entails a minimum of preparation or alteration to the cabinet itself; and in particular it is a primary object of the invention to provide for the effective and reliable automatic control of the apparatus by means of a thermostat mounted and positioned in a manner which ensures its regular and steady working, which guards against its being damaged by external means, and which at the same time does not render the complete apparatus more complicated to apply or affix in position to a refrigeration cabinet.

It is necessary for the thermostat to be exposed to the influence of the air in the refrigerating cabinet, but in order that the apparatus may work in a steady fashion and not be subject to temporary disturbances, such as the falling of heat rays upon the thermostat when the door of the cabinet is opened, it is desirable that the thermostat should be sheltered to a certain extent. To this end it is a particular object of the present invention to enclose the thermostat within a compartment or casing which shields the thermostat from direct external influence but at the same time, by means of openings in the walls of the compartment, leaves the thermostat subject to the changes of temperature in the air within the cabinet.

It will be apparent that the thermostat, which is itself a delicate instrument, will, by being enclosed, be guarded against becoming broken or damaged, for example either when the apparatus is being placed in position on the cabinet or during use by the careless placing of articles within the cabinet.

Further it is the aim of this invention to attain the above objects in the simplest and most convenient manner possible, and to this end the thermostat is located in an extension of or compartment within a casing which forms the brine tank and encloses the evaporator coil, thereby simplifying manufacture and avoiding the necessity for making special structural alterations to the cabinet for accommodating the thermostat and the member surrounding it.

Referring to the drawings:—

Figure 1:
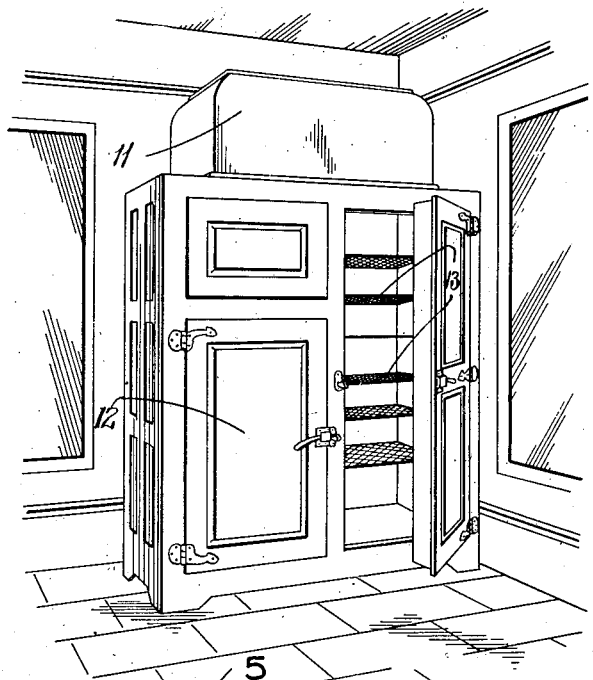
Figure 1 is a perspective view of one form of the apparatus constructed according to this invention.
Figure 2:
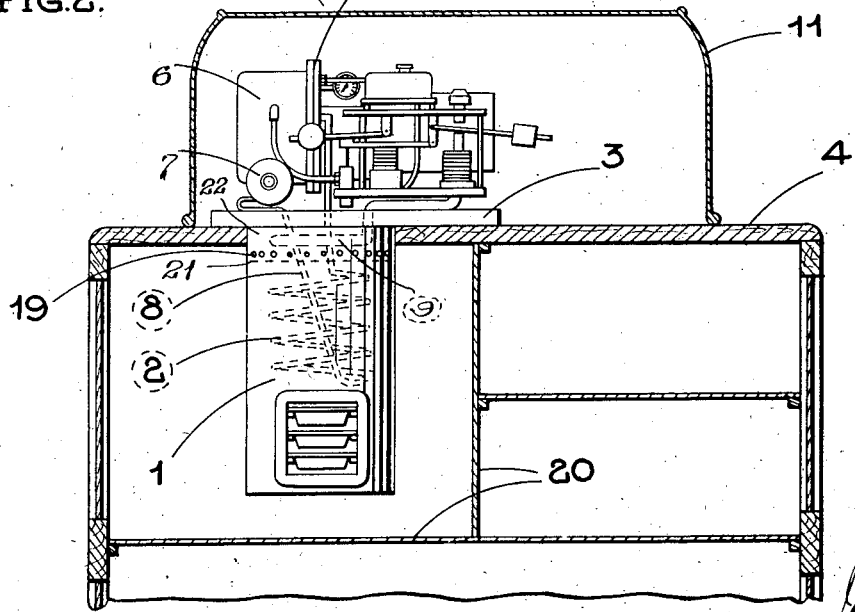
Figure 2 is a fragmental vertical section of same.

In carrying my invention into effect in the preferred form, as illustrated by Figures 1 and 2, the brine tank 1, in which the low pressure evaporator-cooler coil 2 is placed, is attached to the underside of a support formed as a base plate 3 which rests on the top of the cabinet 4. The low pressure chamber, which forms the pump chamber, is made as part of an inner casting 5, to which an outer casting or dome 6 is bolted, the said castings enclosing the high pressure condenser chamber inside which is placed the condenser coil through which the cooling water, if used, circulates. The said castings, the electric motor and the electric switches controlling the motor, and, if used, the tank of cooling water, are supported on the base plate. The liquid condensed in the high pressure chamber drains to the bottom thereof, and flows through a reducing valve 7 fastened to the said chamber, whence it is conveyed by a pipe 8 to the bottom of the evaporator-cooler 2 inside the brine tank 1. The low pressure vapour is conveyed by a pipe from the top of the evaporator-cooler coil to the pump chamber. The pump draws the vapour from the pump chamber, compresses it, and delivers it into the high pressure chamber.

The various parts of the apparatus are fitted in fixed relationship to the support or base plate aforesaid, and the various pipes may be fitted before the refrigerator is dispatched from the factory, which when unpacked has only to be placed in position on the cabinet.

The brine tank 1 near its upper end is provided with a partition 21 thus forming a compartment 22 within which the thermostat 9 is mounted. Openings 19 are provided within the walls of the brine tank 1 to allow the air within the refrigerating compartment surrounding the brine tank to have access to the thermostat 9. The whole of the apparatus which projects above the upper surface of the cabinet is preferably provided with a projecting shield or cover 11 which can be conveniently formed of sheet metal and be readily detachable for the inspection of the apparatus. The cabinet is of the usual construction, having doors 12 and shelves 13. Very little room is taken up by the apparatus, as only the brine tank and thermostat project within the cabinet. The interior of the cabinet 4 is provided with partitions 20 which form a separate compartment for the brine tank.

Figure 3:
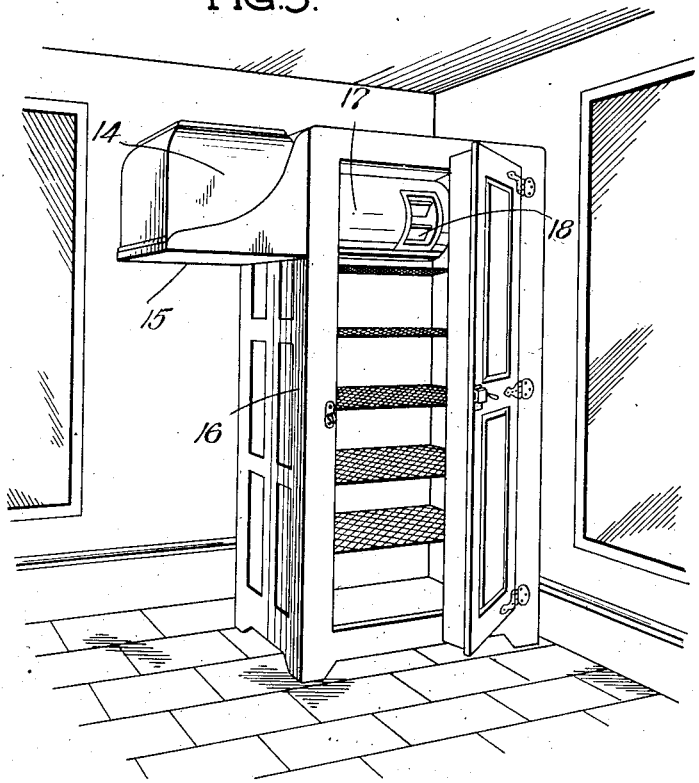
Figure 3 is a perspective view of a modified construction.
Figure 4:
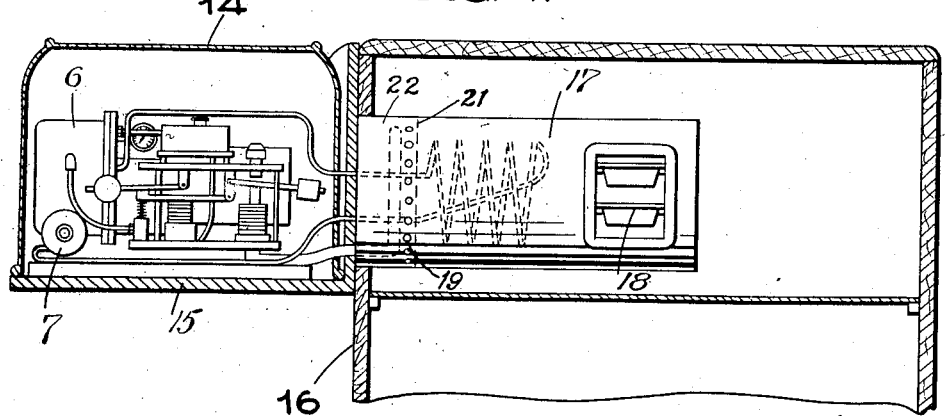
Figure 4 is a sectional view shewing a part of the apparatus illustrated in Figure 3.

In the modified construction illustrated by Figure 3 of the accompanying drawings, which is more particularly designed for use in places where very little headroom is available, the main portion of the apparatus within the usual cover 14 is mounted upon a shelf 15 which projects from the side of the cabinet 16. In this construction the brine tank 17 is mounted horizontally instead of vertically, the shelves for ice trays 18 being also disposed horizontally. This form of apparatus is particularly applicable for use in a room having restricted headroom, but obviously it can be used within any room sufficiently large for its accommodation in place of the construction of apparatus previously described.

Either of the constructions of apparatus just described forms a self-contained unit which can readily be fitted to existing cabinets with very little alteration and can be easily removed when required for cleaning or overhauling.

What I claim then is:—

Refrigerating apparatus comprising a supporting plate, a compressor unit mounted on one side of said plate, said compressor unit including means for driving the compressor and a reservoir for receiving and condensing fluid compressed thereby, a valve for releasing fluid from the reservoir, a casing mounted on the other side of the supporting plate, a partition in the casing dividing it into two compartments, an evaporator coil within one of the compartments and having its ends connected one with the compressor and one with the release valve, said compartment which has the evaporator coil being adapted to contain a fluid for surrounding said coil, and a thermostat within the other compartment for controlling the operation of the apparatus, said thermostat compartment having openings in its walls.

In witness whereof I affix my signature.

ARTHUR GREEN.